| United States Patent [19] | [11] | 4,390,681 |
|---|---|---|
| Deex | [45] | Jun. 28, 1983 |

[54] LIQUID CRYSTAL COPOLYESTERS

[75] Inventor: Oliver D. Deex, Clayton, Mo.

[73] Assignee: Monsanto Company, St. Louis, Mo.

[21] Appl. No.: 354,569

[22] Filed: Mar. 4, 1982

[51] Int. Cl.$^3$ ............................................. C08G 63/60
[52] U.S. Cl. .................................... 528/193; 528/176; 528/190; 528/194; 528/271
[58] Field of Search ............... 528/190, 191, 193, 194, 528/271, 176

[56] References Cited

U.S. PATENT DOCUMENTS

| 3,637,595 | 1/1972 | Cottis et al. | 528/193 |
| 4,064,108 | 12/1977 | Inata et al. | 528/193 |
| 4,083,829 | 4/1978 | Calundann et al. | 528/193 |
| 4,140,846 | 2/1979 | Jackson, Jr. et al. | 528/193 |
| 4,311,824 | 1/1982 | Fayolle | 528/193 |

*Primary Examiner*—Lester L. Lee
*Attorney, Agent, or Firm*—R. Bruce Blance; William J. Farrington; Paul D. Matukaitis

[57] ABSTRACT

Disclosed are liquid crystal copolyesters prepared from p-hydroxybenzoic acid, hydroquinone, a $C_8$ to $C_{12}$ linear aliphatic dicarboxylic acid and optionally an aromatic dicarboxylic acid selected from the group consisting of isophthalic acid, terephthalic acid, 1,5 naphthalene dicarboxylic acid and 2,6-naphthalene dicarboxylic acid.

5 Claims, No Drawings

LIQUID CRYSTAL COPOLYESTERS

BACKGROUND OF THE INVENTION

This invention relates to copolyesters of p-hydroxybenzoic acid, hydroquinone and a $C_8$–$C_{12}$ aliphatic dicarboxylic acid and more particularly to copolyesters of p-hydroxybenzoic acid, hydroquinone and azelaic acid.

The use of objects molded from synthetic polymers has expanded rapidly in the last several decades. In particular, polyesters have widely gained acceptance for general molding applications. Although most polyesters have mechanical properties suitable for general molding applications, most polyesters are not suitable for high strength service because the mechanical properties are not sufficiently high. One group of polyesters that is suitable for high strength service without the need of a reinforcing agent is a new class of polymers exhibiting a general overall balance of mechanical properties substantially enhanced over previous polymers. These polymers have been described by various terms, including "liquid crystalline", "liquid crystal", and "anisotropic". Briefly, the polymers of this new class are thought to involve a parallel odering of the molecular chains. The state wherein the molecules are so ordered is often referred to either as the liquid crystal state or the nematic phase of the liquid crystal state. These polymers are prepared from monomers which are generally long, flat and fairly rigid along the long axis of the molecule and have chain extending linkages that are either coaxial or parallel. For example, liquid crystal copolyesters have been prepared from the following fairly rigid molecular species: p-hydroxybenzoic acid, hydroquinone and terephthalic or isophthalic acid. Such copolyesters are generally high melting and intractable.

I have now found that tractable copolyesters of enhanced liquid crystallinity can be prepared from p-hydroxybenzoic acid, hydroquinone and a fairly flexible linear aliphatic dicarboxylic acid containing 8 to 12 carbon atoms. Optionally, some of the aliphatic dicarboxylic acid can be replaced with an aromatic dicarboxylic acid selected from the group consisting of isophthalic acid, terephthalic acid, 1,5-naphthalene dicarboxylic acid, 2,6-naphthalene dicarboxylic acid and 2,7-naphthalene dicarboxylic acid. Thus the copolyesters of the present invention are capable of forming a thermotropic melt phase at a temperature below about 340° C., have an inherent viscosity of at least 0.3, and consist essentially of the following divalent radicals:

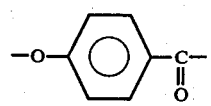

(A)

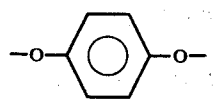

(B)

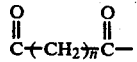

(C)

and

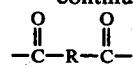

(D)

wherein n is in the range of 6 to 10; wherein R is an aromatic radical selected from the group consisting of 1,3 phenylene, 1,4-phenylene, 1,5 naphthalene, 2,6-naphthalene and 2,7-naphthalene and wherein the range of radical A is from 10 to 70 mole percent of the copolyester and the range of radical C is from 5 to 100 mole percent of the total of radicals C and D.

The copolyesters of the present invention are prepared by an acidolysis procedure in which esters of monocarboxylic acids such as acetic acid are prepared by esterification of the phenolic hydroxy groups of hydroquinone and p-hydroxybenzoic acid and the esters are reacted with the linear aliphatic dicarboxylic acid or with a mixture of the aliphatic and aromatic dicarboxylic acids set forth hereinabove at a temperature in the range of about 250° to about 340° C. The esters can be prepared in situ by reaction of the phenols with acetic anhydride.

The linear aliphatic dicarboxylic acids are selected from the group consisting of suberic acid, azelaic acid, sebacic acid, undecanedioic acid and dodecandioic acid. Azelaic acid is the preferred acid.

The amount of aromatic dicarboxylic acid which can be introduced into the copolyester is determined by the requirement that the copolyester be capable of forming a thermotropic melt phase at a temperature below about 340° C. Therefore with the more linear terephthalic acid molecule, the amount that can be introduced is generally more limited than is the case with isophthalic acid.

In general the copolyester should have an inherent viscosity of at least about 0.3 and more preferably at least about 0.5 in order to provide adequate mechanical properties. The inherent viscosity can, if desired, be increased to values of 0.7 or even higher using conventional techniques such as melt or solid state polymerization. The inherent viscosity is determined at 30° C. with a solution of 0.5 gram of copolyester per 100 ml of a solvent composed of 60 weight percent phenol and 40 weight percent tetrachloroethane.

The enhanced liquid crystallinity of the copolyesters can be demonstrated from the optical anisotropy of the melt above the flow temperature and from the melt viscosity behavior versus rate of shear. The degree of ordering in the melt causes the melt viscosity to be extremely shear sensitive and the melt viscosity can reach extremely high values at low rates of shear depending on the degree of ordering of the polymer molecules in the melt. The shear sensitivity of melt viscosity of the copolyesters of the present invention occurs over a lower range of shear rates than that of wholly aromatic polyesters and shows that a greater degree of ordering takes place.

Advantageously the ratios of monomers in the copolyesters of the present invention can be selected to provide copolyesters which are tractable at a low temperature, the flow temperature at which they form a thermotropic melt phase being substantially below 340° C. and to have a high long-term use temperature associated with a high glass transition temperature. Preferably the glass transition temperature is at least about 110° C.

Among the preferred compositions, are copolyesters containing from about 20 to about 45 mole percent of p-hydroxybenzoic acid units and more preferably compositions containing from about 20 to about 45 mole percent p-hydroxybenzoic acid units, wherein from about 5 to about 25 mole percent of the dicarboxylic acid units are provided by the linear aliphatic dicarboxylic acid and the remaining dicarboxylic acid units are isophthalic acid units.

The copolyesters of the present invention can contain nucleating agents, fillers, pigments, glass fibers, mineral reinforcing agents, antioxidants, stabilizers, plasticizers, lubricants, fire-retardants and other additives.

The copolyesters are useful for preparing molded objects, films, fibers and the like. For example, they may be injection molded by conventional means and they may be formed into fibers by melt spinning and subsequently drawn, and further processed according to conventional techniques.

The invention is further illustrated but is not intended to be limited by the following examples in which parts and percentages are by weight unless specified otherwise.

EXAMPLE 1

A mixture of 0.1 parts by weight Na$_3$PO4 12H$_2$O, 10.0 parts by weight (0.072 mol) p-hydroxy benzoic acid, 8.0 parts by weight (0.073 mol) hydroquinone, 10.3 parts by weight (0.062 mol) isophthalic acid, 2.1 parts by weight (0.011 mol) azeleic acid and 25.0 parts by weight (0.244 mol) acetic anhydride is placed in a reaction vessel equipped with a stirrer and a condenser. The mixture is heated under a nitrogen blanket at reflux (130° C.) for about one hour. Next the temperature of the bath is raised slowly to 250° C. and approximately 16 parts by weight acetic acid and acetic anhydride is distilled. There is a brief cessation of acetic acid distillation after the ester acetic acid and excess anhydride distills, but at 250° C. polymerization soon starts and more acetic acid distills. The bath temperature is raised at a rate sufficient to keep the acetic acid distilling at a reasonable rate. When about 28 parts by weight (total) of distillate is collected and the reaction temperature is about 290°-300° C., vacuum is gradually applied to finish the reaction. The polymer product is light tan in color and highly crystalline. The inherent viscosity measured in 60/40 W/W phenol/sym-tetrachloroethane at a concentration of 0.5 g polymer/100 ml solvent is 0.70. It can be readily molded into articles or drawn into fibers. The melt is very anisotropic when viewed under crossed polalizers. The liquid crystal behavior of the melt is demonstrated by the melt viscosity behavior of the melt at 304° C. A log-log plot of apparent melt viscosity versus shear rate shows a substantial, approximately linear decrease from $2\times10^5$ poise, at a shear rate of 2 sec.$^{-1}$ to $2\times10^3$ poise at a shear rate of 3000 sec.$^{-1}$. In contrast a non liquid crystal polymer, polyethylene terephthalate has a constant apparent melt viscosity of about $4\times10^3$ poise at shear rates in the range of 2 sec$^{-1}$ to 3000 sec$^{-1}$.

The glass transition temperature of the polymer is 129° C. and the melting point is 290° C. The ratio of Tm/Tg(°K.) is 1.40. The polymer is melt extruded from a 1-oz Arburg extruder at a temperature of 335° C., the hold time in the extruder being 5 sec and the screw speed 180 rpm. The mold temperature is 46° C. and the injection time is 4 sec. The tensile strength of a bar of polymer (1.25 cm×0.32 cm) is 138 MPa with elongation at failure of 10%. The tensile modulus is 3600 MPa. By variation of the extrusion temperature in the range of 310° to 330° C., the hold time in the extruder in the range of 5 to 120 secs., the screw speed in the range of 90 to 400 rpm, the injection time in the range of 4 to 7 secs. and the mold temperature in the range of 46° to 145° C., values are obtained for tensile strengths in the range of 23 to 139 MPa, elongations in the range of 1.6 to 10 percent, tensile moduli in the range of 1720 to 3600 MPa and notched impact strengths in the range of 0 to 586 J/m notch.

Under the same extrusion conditions, test samples 0.32 cm×0.16 cm are obtained which possess tensile strengths in the range of 46 to 275 MPa, elongations in the range of 2.9 to 24.1 percent and tensile moduli in the range of 2000 to 4200 MPa. The notched Izod impact strength of bars 0.32 cm thick, is 380 J/m notch.

EXAMPLE 2

A polyester comprising 33.3 mol percent p-hydroxybenzoic acid units, 33.3 mol percent hydroquinone units, 30 mol percent isophthalic acid units and 3.33 mol percent azelaic acid units is prepared by the method of Example 1. The inherent viscosity of the polyester is 0.73. The glass transition temperature is 121° C., the melting point is 300° C. and the Tg/Tm ratio (°K.) is 1.45.

The polyester melt is very anisotropic when it is viewed under crossed polarizers. The apparent melt viscosity at 304° C. is about $4.0\times10^5$ poise at a shear rate of 2 sec$^{-1}$ and is about $2\times10^3$ poise at a shear rate of 3000 sec$^{-1}$. A log-log plot of apparent melt viscosity versus shear rate over this range in shear rate is almost linear, demonstrating the liquid crystal behavior of the polymer.

The polymer is melt extruded from a 1-oz. Arburg extruder at a temperature of 320° C., at a maximum injection pressure, back pressure and holding pressure and at a screw speed of 180 rpm. The injection time is 0.3 to 0.5 min. The mold temperature is 125° F. The tensile strength of the polyester (sample size 0.32 cm×0.16 cm) is 210 MPa, and the tensile modulus is 7230 MPa. The notch Izod impact strength is 690 J/m notch.

EXAMPLE 3

A polyester comprising 33.3 mol percent p-hydroxybenzoic acid units, 33.3 mol percent hydroquinone units, 26.6 mol percent isophthalic acid units and 6.67 mol percent azelaic acid units is prepared by the method of Example 1. The inherent viscosity of the polyester is 0.74. The glass transition temperature is 116° C., the melting point is 277° C. and the Tg/Tm ratio (°K.) is 1.41.

The polyester melt is very anisotropic when it is viewed under crossed polarizers. The apparent melt viscosity at 304° C. is about $2\times10^4$ poise at a shear rate of 2 sec$^{-1}$ and is about $5\times10^2$ poise at a shear rate of 3000 sec$^{-1}$. A log-log plot of apparent melt viscosity versus shear rate over this range in shear rate is almost linear, demonstrating the liquid crystal behavior of the polymer.

EXAMPLES 4–11

Further Examples 4–11 of copolyester compositions were prepared by the process of Example 1. The compositions and melting behavior properties of the copolyesters are set forth in Table 1 along with data for Examples 1–3. Example 7 which contains no azelate units, set up in the reaction vessel and became intractible. The degree of liquid crystallinity of the polyesters increased with increasing azelate content. The glass transition temperature of polyesters containing from about 1 to about 10 mol percent of azelate units (Examples 1-5) showed a surprising increase over the glass transition temperature of the polyester containing no azelate (Example 7).

EXAMPLE 12

The copolyester composition of example 1 is prepared to provide a polyester of inherent viscosity 0.43. The apparent melt viscosity of the polyester at 270° C. decreases linearly from $2.2 \times 10^6$ poise at a shear rate of 0.1 sec.$^{-1}$ to $2.0 \times 10^1$ poise at a shear rate of 200 sec.$^{-1}$.

TABLE 1

COPOLYESTERS OF P-HYDROXYBENZOIC ACID, HYDROQUINONE, AND AZELAIC ACID

| Example | \multicolumn{4}{c}{Copolymer Composition, mol %} | $T_g$,°C. | $T_m$,°C. |
| --- | --- | --- | --- | --- | --- | --- |
|  | P | H | I | A |  |  |
| 1 | 33.3 | 33.3 | 28.3 | 5.00 | 129 | 290 |
| 2 | 33.3 | 33.3 | 30.0 | 3.33 | 121 | 300 |
| 3 | 33.3 | 33.3 | 26.6 | 6.67 | 116 | 277 |
| 4 | 33.3 | 33.3 | 31.7 | 1.67 | 125 | 306 |
| 5 | 33.3 | 33.3 | 23.3 | 10.00 | 111 | 255 |
| 6 | 33.3 | 33.3 | 16.7 | 16.7 | 90 | 170 |
| 7 | 33.3 | 33.3 | 33.3 | 0 | 110 | 333 |
| 8 | 33.3 | 33.3 | 0 | 33.3 | 49 | 169 |
| 9 | 20.0 | 40.0 | 34.0 | 6 | 138 | 298 |
| 10 | 50.0 | 25.0 | 20.0 | 5 | 112 | 330 |
| 11 | 66.7 | 16.7 | 11.7 | 5 | 90 | 335 |

P-p-hydroxybenzoic acid
H-hydroquinone
A-azelaic acid
I-isophthalic acid
$T_g$-glass transition temperature
$T_m$-thermotropic melt temperature

What is claimed is:

1. A copolyester capable of forming a thermotropic melt phase at a temperature below about 340° C. and having an inherent viscosity of at least about 0.3, consisting essentially of the following divalent radicals:

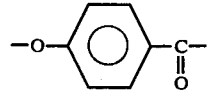 (A)

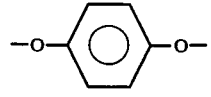 (B)

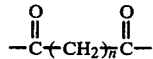 (C)

and

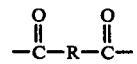 (D)

wherein n is in the range of 6 to 10; wherein R is an aromatic radical, selected from the group consisting of 1,3 phenylene, 1,4-phenylene, 1,5 naphthalene, 2,6-naphthalene, 2,7-naphthalene, wherein the range of radical A is from 10 to 60 mole percent of the copolyester and the range of radical C is from 5 to 100 mole percent of the total of radicals C and D and wherein the inherent viscosity is determined at 30° C. with a solution of copolyester in a phenol symtetrachloroethane solvent pair of weight ratio 3:2, at a concentration of 0.5 gram per 100 ml.

2. The copolyester of claim 1 wherein the range of radical A is from 20 to 45 mole percent of the copolyester.

3. A copolyester capable of forming a thermotropic melt phase at a temperature below about 340° C. and having an inherent viscosity of at least about 0.3, consisting essentially of the following divalent radicals:

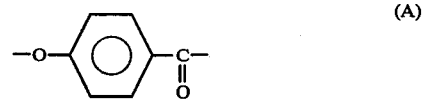 (A)

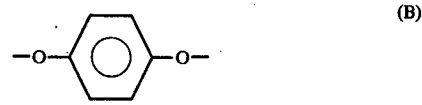 (B)

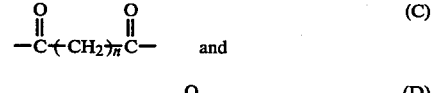 (C)

and

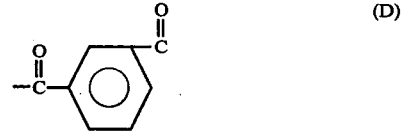 (D)

wherein n is in the range of 6 to 10; wherein the range of radical A is from 20 to 45 mole percent of the copolyester, the range of radical C is from 5 to 25 mole percent of the total of radicals C and D, and wherein the inherent viscosity is determined at 30° C. with a solution of copolyester in a phenol/symtetrachloroethane solvent pair of weight ratio 3:2 at a concentration of 0.5 g copolyester per 100 ml.

4. The copolyester of claim 2 or 3, wherein the inherent viscosity is at least 0.5.

5. The copolyester of claim 2 or 3, wherein n is 7.

* * * * *